May 16, 1933.  J. E. FULLER  1,909,340
WHIST TABLE
Filed Feb. 21, 1929  4 Sheets-Sheet 1

Inventor.
Judson E. Fuller.
by his Attorneys.

Witness

May 16, 1933.  J. E. FULLER  1,909,340

WHIST TABLE

Filed Feb. 21, 1929  4 Sheets-Sheet 2

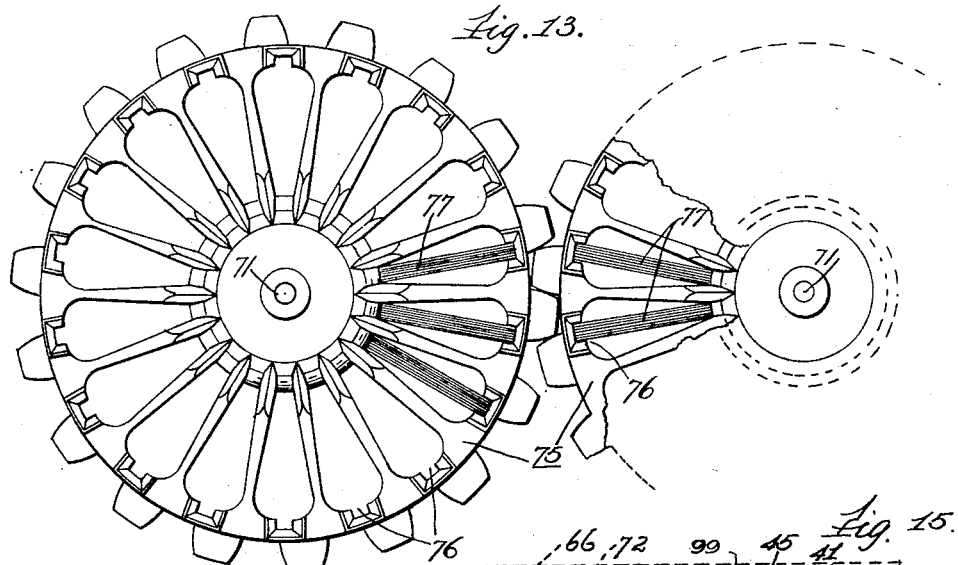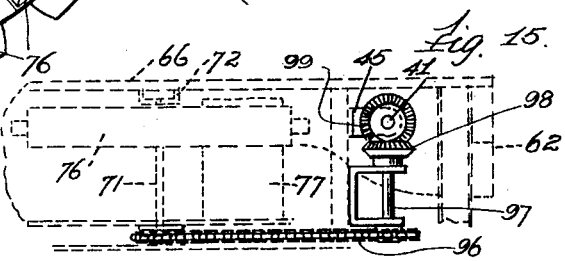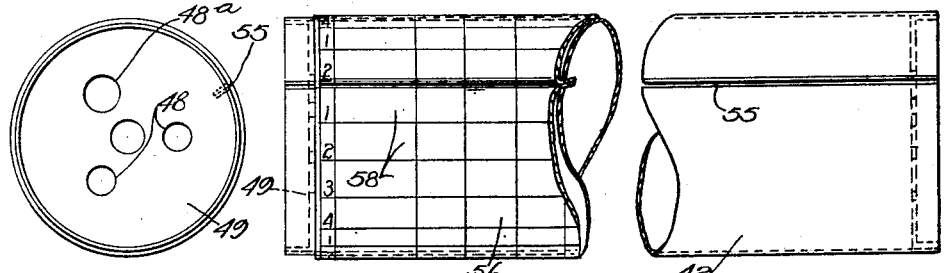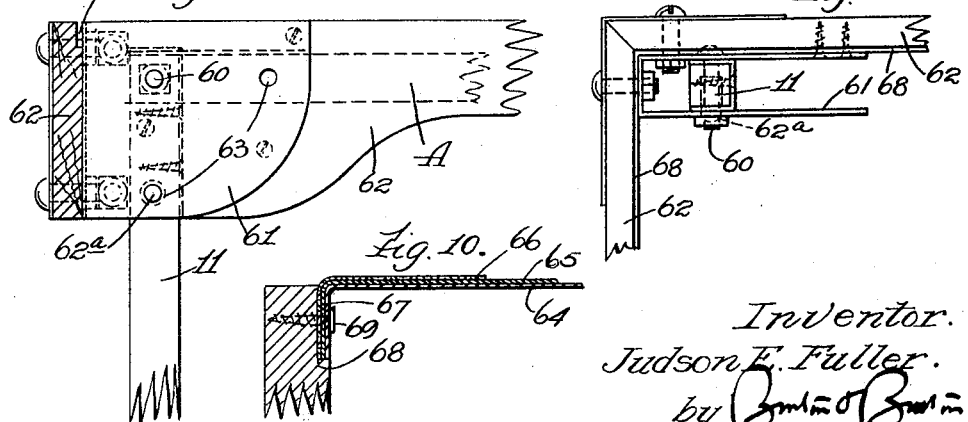

May 16, 1933.  J. E. FULLER  1,909,340
WHIST TABLE
Filed Feb. 21, 1929  4 Sheets-Sheet 4
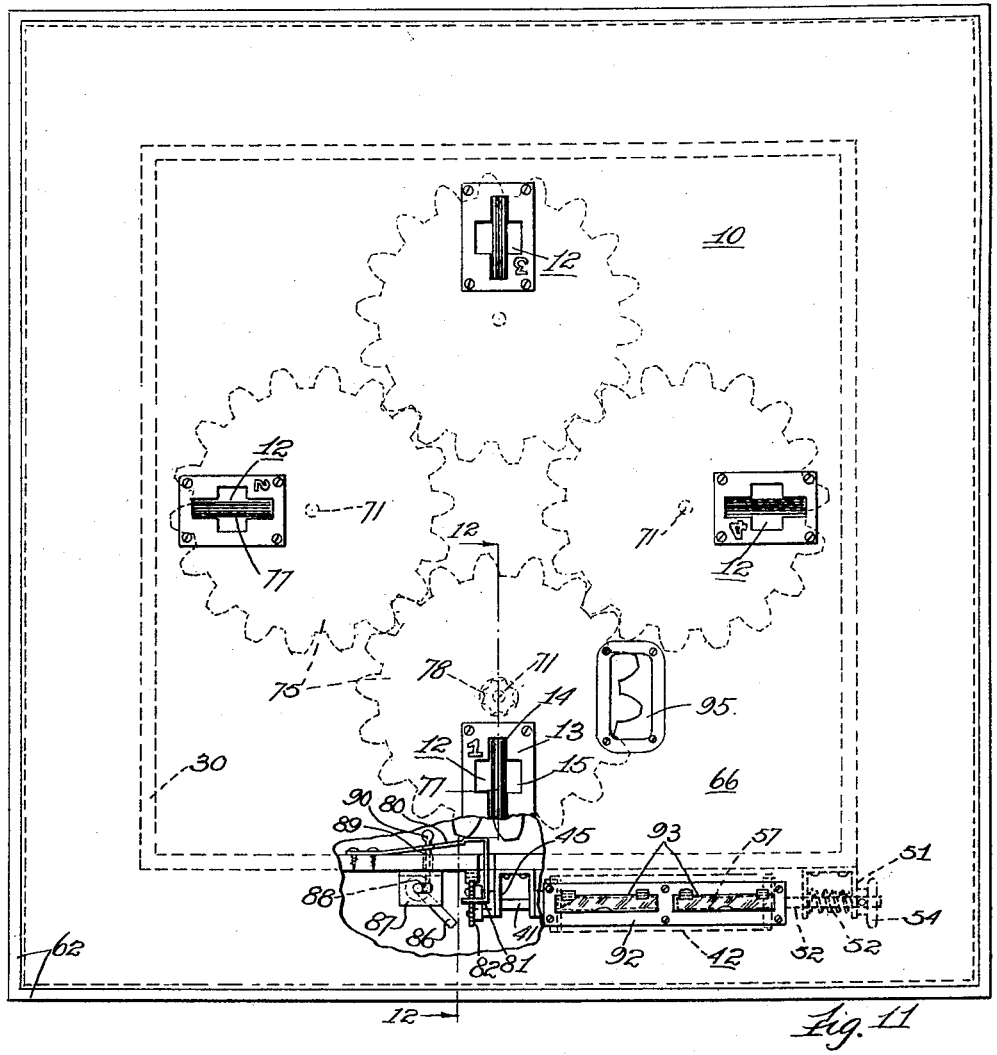
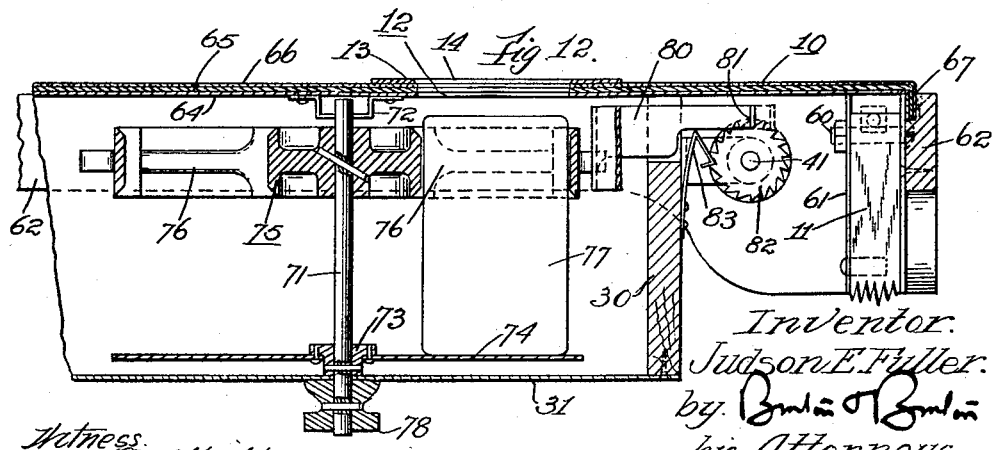
Inventor.
Judson E. Fuller.

Patented May 16, 1933

1,909,340

UNITED STATES PATENT OFFICE

JUDSON E. FULLER, OF RIVER FOREST, ILLINOIS, ASSIGNOR OF ONE-HALF TO FREDERIC D. UTLEY, OF DETROIT, MICHIGAN

WHIST TABLE

Application filed February 21, 1929. Serial No. 341,593.

This invention relates to apparatus used in playing the game of "duplicate bridge whist" which consists in using a separate deck of cards for each hand played, and keeping the hands of each deck intact for replaying, so that after a series of hands (say twelve or more) have been played by two pairs of partners, the hands are re-dealt, and without shuffling or mixing the hands are replayed by the opposing partners.

An object of this invention is to provide an improved apparatus which in itself is especially adapted to serve as the card playing table, and equipped with card-receiving carriers having pockets, arranged so that the cards of several decks may be shuffled in advance of commencement of play and each deck distributed in four hands and placed in the carriers, the carriers being then so controlled that only the four hands which make up one full single deck will be presented at one time for play.

Another object is to provide a game apparatus wherein the played hands of the decks of cards may be conveniently disposed of, keeping each hand intact and separated from the others, insuring against intermixing of the cards comprising the hands so that the exact hands may be re-dealt and replayed by the opposite partners.

A further object is to provide novel means for recording the score wherein the score chart is synchronized with the card-retaining pockets of the cylinder so that a fresh score recording space will be exposed each time the pockets containing hands of unplayed cards are presented for play. An incidental result of this arrangement is that it provides a score recording chart adapted to indicate whether the hands of cards presented for play have been once played before.

The invention consists in certain features and elements of construction, in combination, herein shown and described, as indicated by the claims.

In the drawings:

Figure 5 is a view of a duplicate score recording chart.

Figure 6 is a detail of the recording drum broken, to condense the view; one portion being shown with the recording chart wrapped thereon.

Figure 7 is an end view of the recording drum.

Figure 8 is a detail sectional view of the table leg mounting.

Figure 9 is a top view of the table leg mounting, with the top of the table omitted.

Figure 10 is a cross section through the table taken at line, 10—10, on Figure 1.

Figure 11 is a plan view of a card game apparatus of modified construction.

Figure 12 is an enlarged fragmentary sectional view taken as indicated at line, 12—12, on Figure 11.

Figure 13 is a detail of card carriers for the modified construction.

Figure 15 is a detail of a modified form of drive for the score recording drum.

Figure 1:
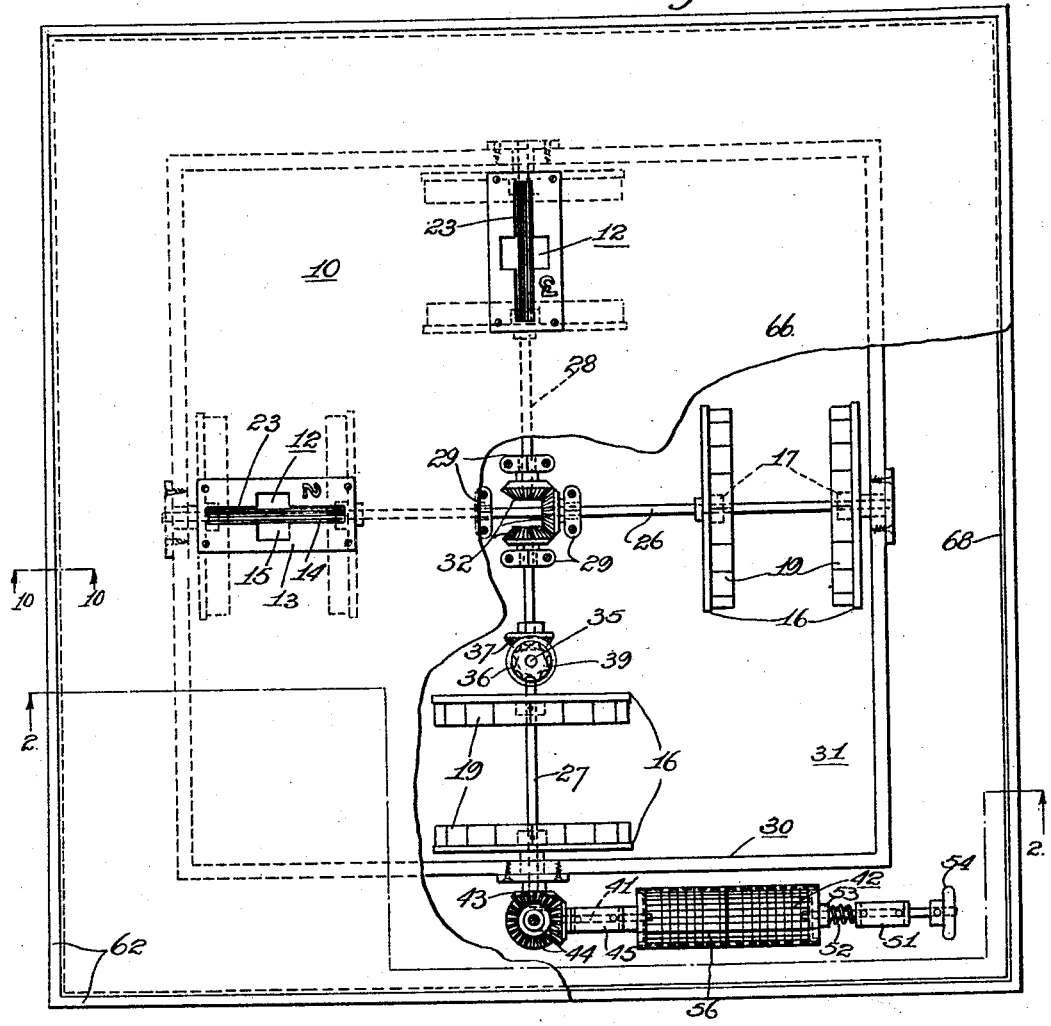
Figure 1 is a plan view of card game apparatus embodying the present invention; part of the table top being broken away to show details of construction.
Figures 2, 14:
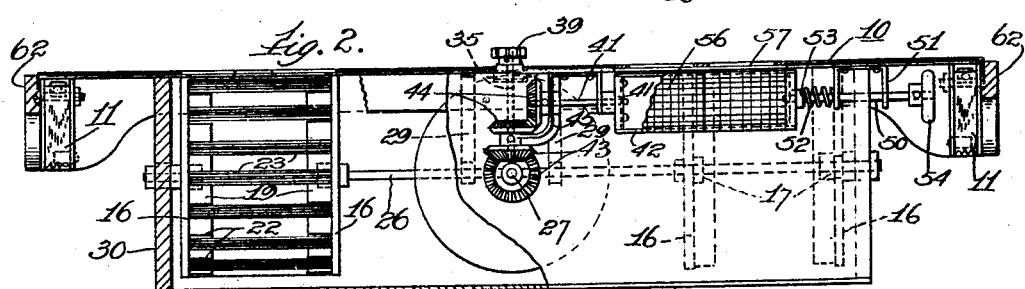
Figure 2 is a cross section taken substantially as indicated at line, 2—2, on Figure 1.
Figure 14 is a fragmentary detail showing the driving means for the recording drum.
Figure 3:
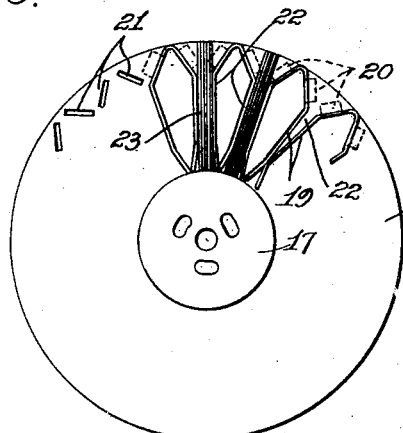
Figure 3 is a fragmentary view of the card carrier with packs of cards inserted in the radial pockets.
Figure 4:
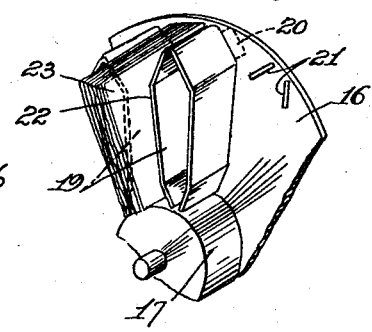
Figure 4 is a fragmentary perspective view of one end of the card carrier.

The game apparatus illustrated in the accompanying drawings is in the nature of a collapsible table and comprises a playing board, 10, preferably square in shape, supported on folding legs, 11. In the top of the board are four apertures, 12, spaced at 90 degrees apart at the respective sides of the board occupied by the several players. Since in playing the game the cards contained in the hands of the respective players are not played to the center of the board, but are laid down immediately in front of the player, or to one side (and not mixed with cards of the other hand) the apertures are preferably located at a substantial distance inwardly of the edges of the table. Surrounding each of the apertures is an escutcheon plate, 13, having an elongated slot, 14, of a size permitting facility in inserting and extracting a pack of cards (constituting one hand) therethrough. The slot is enlarged as at 15, adjacent its longitudinal center to admit the fingers of a player to grip the pack of cards in extracting them. Beneath each aperture or slot, is journaled a card-carrier drum rotatable about a horizontal axis; each of said carrier drums consist of a pair of axially spaced end disks, 16, secured to a hub portion, 17; the opposing faces of each pair of end disks are provided with a series of U-shaped spring members, 19, arranged in spaced radial relation about the hub portions. The spring members, 19, are positioned with their closed ends extending outwardly, and are formed with two oppositely extending tangs, 20, adapted to engage in slotted apertures, 21, formed near the periphery of each disk. These spring members are spaced so as to form radial pockets, 22, between the adjacent members for receiving and retaining in edgewise relation (under the spring tension of the ends of said spring members) the packs of cards indicated at 23, constituting the individual hands of several decks of cards.

Two of the carrier drums are mounted on shaft, 26, and the other carrier drums are mounted on short individual shafts, 27 and 28. These shafts are journaled adjacent the center of the table in bearing brackets, 29, secured to the under side of the table top and at their outer ends in a rectangular sub-frame, 30, which depends from the under side of said table top, and has its lower end closed by a plate, 31, so as to form a housing for the carrier drums and their driving mechanism. The shafts 27 and 28, are interconnected adjacent the center of the board by three bevel gears, 32, carried on said shafts in meshed relation so that the card-carrier drums may be simultaneously rotated in synchronized relation for registering successively the pockets of the drums with their co-operating apertures. It is to be understood that preliminary to commencement of the game, several decks of cards are shuffled separately, and dealt into four hands (or packs) each, and these hands of cards are distributed to the pockets of the carrier drums; the four hands of each deck being placed in the pockets of the drums which are in simultaneous registration with the apertures or slots, 12, so that for any position of the drums the hands of cards available through these slots are the cards of a single deck.

A vertical drive shaft, 35, is journaled in the top of the board inwardly of one of the carrier drums, in alignment with shaft, 27. The lower end of shaft, 35, is fitted with a bevel gear, 36, meshed with a co-operating bevel gear, 37, on the shaft, 27. The upper end of shaft, 35, projects above the surface of the playing board and is fitted with a hand knob, 39, adapted to be grasped and turned for rotating the drums at will.

The outer end of shaft, 27, extends beyond the sub-frame, 30, from which is operated a drive shaft, 41, for a score recording drum, 42, by means of two sets of bevel gears, 43 and 44, which are partially supported with the shaft, 41, in bearing bracket, 45, secured to the under side of the top of the table. The inner end of the drive shaft, 41, is fitted with a driving disk, 46, having three radially spaced, axially extending projections, 47, which may be screw heads, for detachably engaging in co-operating apertures, 48 and 48ª formed in the end, 49, of said score drum, for rotating the same in synchronized relation with the carrier drums. The opposite end of the score drum is removably journaled on a pin, 50, supported in bracket, 51, with a coiled spring, 52, interposed between the bracket and a boss, 53, on said pin, for normally maintaining the drum in driving mesh with the projections, 47. The outer end of the pin, 50, is provided with a hand knob, 54, to facilitate retraction of the pin against the reaction of spring, 52, to permit removal of the score drum. The score drum is provided with a longitudinal rift, 55, in its periphery formed by flanging inwardly the adjacent edges thereof. Inserted in said rift (as shown in Fig. 6) are the edges of a ruled score recording chart, 56, of sheet material by means of which said chart is secured in wrapped position around the drum. When a progressive game is played, in which the players or partners move from one table to another, they will take the score chart with them. In this event, the fact that the hole 48ª and its co-operating projection or screw head are larger than the holes 48 insures that the drum will always be replaced in the same relative position with reference to cards in the carrier pockets, while the rift, 55, of each drum provides a single definite position for the score chart thereon.

An elongated slot or window, 57, is formed in the top of the board preferably in axial alignment with the drum through which is exposed a portion of the score recording chart. The chart is provided with a series of score recording spaces, 58, as indicated in Figure 5, corresponding to the number of pockets of a carrier drum, so that, as the drums are revolved by turning knob, 39, to register fresh hands of cards with their slots, 12, the score drum will be correspondingly rotated, presenting a fresh score recording space in registration with the windows, 57. It will be manifest that each score line or space corresponds to a definite set of pockets of the drums and after the hands of a deck have been played, (as previously mentioned the cards of a hand are never mixed with other hands in playing) the respective hands or packs of cards are replaced in their pockets and the drums again rotated to present a different deck of cards. Thus, by marking the score in the chart space presented corresponding to any available deck of cards, it will thereafter be apparent from the chart whether or not a deck of cards presented at the slots or apertures, 12, has been previously played.

The chart is made in duplicate form, with the score spaces in alignment side by side so that after all the decks of cards have been played once, the pairs of partners change places, (or the table is rotated ninety degrees) so that they will play the exact hands previously played by their opponents. Thus a score chart arranged in this manner facilitates and expedites playing the game, and affords a convenient method of comparing scores. After the hands have been played in "duplicate", the score drum may be removed from its mounting, and the score chart taken off to be totaled and preserved if desired.

The table construction illustrated has been found particularly suitable for this use. Folding legs, 11, are provided adjacent each corner and are pivoted at 60, in a metal U-shaped frame, 61, secured to the side members, 62, of said table which are preferably of wood. At a distance from the pivot each leg is provided with a "bullet catch" 62$^a$, yieldingly forced outward by a spring (not shown) for engaging one or the other of apertures, 63, in the frame, 61, for maintaining the leg in upright supporting position or in folded relation as indicated in dotted lines at "A". The top of the table is shown as made of a sheet metal plate, 64, having a pad, 65, thereon, which is covered with a suitable fabric, 66. The edges of the plate, 64, are flanged downwardly as at 67, with the padding and covering co-extensive therewith, and are set into a rabbet, 68, formed around the inner upper edges of the side members, 62, and secured thereto by the screws, 69, as shown in Fig. 10.

Figs. 11 to 13, illustrate a modified form of my invention, the table or playing board proper and the score recording drum being substantially the same as previously described. In this modified construction the card carriers are rotatable on vertical shafts, 71, journaled at their upper ends in brackets, 72, secured to the under side of the top plate, 64, the lower ends of the shafts having bearing support upon thrust collars, 73, fixed thereto and rotatively abutting the bottom plate, 31; the end of each shaft projects through the plate. Each of the carrier drums includes a horizontally disposed, circular bottom disk, 74, secured to the collars, 73, and a gear, 75, which is formed as a casting with radial pockets, 76, for the cards. Each gear is fixed to its shaft and the teeth of each gear mesh with the teeth of two adjacent gears, so that all the gears may be simultaneously rotated in synchronized relation.

The pockets or slots, 76, are adapted to be successively registered with the slots or apertures, 12, in the top of the board and due to the intermeshing of the gear teeth, the pockets will be aligned with their slots simultaneously. The pockets, 76, are each located in overlapping relation to a gear tooth and its adjacent tooth space; that is, each pocket is centered half-way between the center of a tooth and the center of the next adjacent tooth space; this arrangement permits all the pocket gears to be exactly alike, thus requiring only one pattern. As shown, the number of teeth of the gears is the same as the number of pockets, which may be any number corresponding to the number of hands usually played in a game.

Each pocket in the gear is shaped for receiving a pack of cards as indicated at 77, constituting a hand, the cards being inserted endwise, so that the lower ends rest on the disk, 74, which is rotatable with the co-operating pocket casting. Constructing the drums to receive the cards endwise permits using a smaller pocket casting and gear thus keeping the mechanism within reasonable dimensions. The distribution of the cards is substantially the same as mentioned above, the hands of cards presented simultaneously at the four slots, 12, being the cards of the same deck. One of the vertical shafts, 71, extends downwardly through the plate, 31, and may be fitted thereat with a hand knob, 78, for rotating all of the drums.

In addition to the operating knob, 78, I have shown an opening, 95, in the top of the table through which the teeth of one of the gears, 75, may be engaged by the finger for rotating them. This feature may be embodied in the same structure with the knob, 78, or it may replace the knob entirely.

The drive for the recording drum, 42, consists of a spring member, 80, secured to the inner side of sub-frame, 30, in co-operating engagement with the teeth of one of the gears, the opposite end of the member extending through the sub-frame, 30, has a projection, 81, adapted to actuate a ratchet, 82, mounted on the end of the score drum drive shaft, 41. A check spring detent, 83, is secured to the outside of sub-frame and engages said ratchet to prevent reverse rotation of the recording drum. Thus each time the carrier drums are rotated to align a new hand of cards at the slots, 12, the teeth of a pocket gear actuates the member, 80, to impart rotation to ratchet, 82, so that the score drum will be correspondingly rotated to align a fresh score recording space of the chart, 56, with the window, 57. The score drum is otherwise similar to that already described except that as shown in Figures 11 and 12, the journal brackets, 45 and 51, are secured to the outside of the sub-frame, 30. Occasion may arise when it is desirable to revolve the carrier drums freely and independently of the score drum especially since the detent drive mechanism permits rotation in only one direction, and for this purpose I provide a clamp device operable at will for holding the member, 80, out of engagement with the gear teeth of the pocket gear. This mechanism includes an operating lever, 86, supported in bracket, 87, and connected to a crank, 88, to the end of which is pivoted a link, 89, slidably supported in an aperture in the sub-frame and having a head, 90, engaging the inner surface of the member, 80, so that upon swinging of the lever, 86, to the left from the position indicated in the drawing, the link, 89, is moved to force the member, 80, out of engagement with the gear teeth.

Fig. 15 shows a simplified drive for the drum, 42, comprising a chain running over a sprocket wheel on one of the shafts, 71, and thence over another sprocket on a shaft, 97, journaled in upright position below the end of the drum shaft, 41. Bevel gears, 98 and 99, complete the connection to the drum shaft, 41, which is thus positively geared to the carriers, 75, at all times.

To make the game more interesting, it is desirable to prevent an immediate comparison of scores or bids made by the respective pairs of partners for any given hand of cards. For this purpose an escutcheon plate, 92, is mounted on the top of the table surrounding the window, 57, and two separate covers, 93, are hinged to the escutcheon plate to overlie the respective score recording portions of the duplicate chart. Thus either portion of the score chart may be kept concealed or exposed at will.

It will be noted that as shown in Fig. 5, the score chart carries the numerals 1, 2, 3 and 4, which may conveniently designate the four players respectively, so that for each position of registration of the chart at the window, 57, it automatically indicates the proper order of the bidding or play corresponding to the hands of cards presented by that position of the carriers. For identifying the several decks or hands, especially for the purpose of progressive play, the score chart may include a supplemental series of index characters, one at each horizontal space of the form; in Fig. 5 these are shown as the letters A to R, at the left-hand edge of the sheet.

I claim:—

1. A game apparatus comprising a playing board having apertures adjacent each of a plurality of edges thereof, revolvable carriers mounted on the under side of the board on vertical axes, one located adjacent each aperture, each carrier being provided with a series of radially disposed card-holding pockets adapted to be registered with its corresponding aperture, and with the cards in each pocket disposed in edgewise relation, said carriers each being provided with a gear intermeshed with similar gears on two adjacent carriers for synchronizing the carriers to simultaneously register the successive pockets thereof with their apertures, said carriers each including a vertically disposed shaft journaled on the board, a disk secured to the shaft adjacent the lower end thereof, said gear being rigidly secured on said shaft adjacent the upper end; said pockets consisting of a series of radially arranged slots in the gear through which the pack of cards is inserted for support on said disk, said card-receiving slots in the gears being each centered between the center line of a tooth and the center of the next adjacent tooth space.

2. A game apparatus comprising a playing board having apertures adjacent each of a plurality of edges thereof, card holding means mounted beneath the board including a revoluble carrier for each aperture, gearing operably connecting said carriers together in synchronized relation, each carrier being provided with a series of card-holding pockets adapted to be registered with said apertures, a revoluble drum mounted below the top of the board, means for driving the same in synchronized relation with the carriers, a score chart provided on the outer surface of the drum including a plurality of score recording spaces corresponding to the pockets of said carriers and means for revolving said carriers to bring a set of pockets in registration with said apertures and simultaneously presenting, for recording the score, a score space of the chart corresponding to the set of registered pockets.

3. In the combination defined in claim 2, said board being provided with a window over said drum to afford access to the aligned score space of the chart corresponding to the set of pockets of the carriers registered with the apertures.

4. In the combination defined in claim 2, said score chart consisting of a piece of sheet material detachably secured around the periphery of the drum and having a series of score recording spaces corresponding to the number of pockets of a carrier.

5. In the combination defined in claim 2, said drum being removably mounted and detachably connected with said driving means to permit adjustment of the score chart thereon, and yielding means adapted to normally maintain the drum in operative engagement with said driving means when in mounted position.

6. In the combination defined in claim 2, the chart being provided with duplicate score recording spaces, aligned with each other side by side, said board having formed therein a window over the drum positioned to expose both portions of the duplicate score recording space, and hinged closure members on said board formed to cover the window and adapted to be manipulated at will for exposing either or both portions of the aligned, duplicate score recording space.

7. A game apparatus comprising a play board having apertures adjacent each of a plurality of edges thereof, card holding means mounted beneath the board including a revoluble carrier for each aperture, gearing connecting said carriers together in synchronized relation, each carrier having a series of card holding pockets adapted to be registered with the corresponding aperture of the board, a revoluble drum connected to rotate in synchronized relation with the carriers, a score chart provided on the outer surface of said drum and including a series of score recording spaces corresponding respectively to the pockets of the carriers, a sight opening associated with said drum and dimensioned to expose the score recording spaces corresponding to the pockets which are registered with the apertures of the board at any given position of the pockets, said score chart including prearranged notations determining the order of play for any given set of pockets which may be registered with the apertures to render the cards therein accessible to the players.

8. A game apparatus comprising a playing board having apertures adjacent each of a plurality of edges thereof, card holding means mounted beneath the board including a revoluble carrier for each aperture, gearing operably connecting said carrier together in synchronized relation, each carrier being provided with a series of card-holding pockets adapted to be registered with said apertures, means for rotating said carriers for simultaneously registering the successive pockets of said carriers with their apertures, a revoluble score drum mounted below the top of the board in registration with an opening provided in the top of said board, the peripheral surface of the drum being provided with a plurality of score recording spaces corresponding to the pockets of the carriers, and driving means operable by one of said carriers for advancing the score drum through an angular distance corresponding to the angular rotation of the carrier, for aligning a score space at the opening simultaneously with the registration of a set of pockets of said carriers with their apertures.

9. In a game apparatus as defined in claim 7, means operable at will for disengaging said driving means whereby said carriers may be rotated independently of the score drum.

10. In the combination defined in claim 2, said score chart being provided with an indication associated with each score recording space for designating the proper order of play corresponding with the cards in any given set of pockets.

11. A game apparatus comprising a playing board having a top and a skirt depending therefrom adjacent the marginal edges thereof, the top being provided with an aperture adjacent each of a plurality of edges thereof, card-holding means mounted beneath the top, including a revolvable carrier for each aperture, gearing operably connecting said carriers together in synchronized relation, each carrier being provided with a series of card-holding pockets adapted to be registered with its corresponding aperture, a revolvable drum mounted below said top and disposed within the vertical limits of said skirt and in registration with an aperture, means for driving the drum in synchronized relation with the carriers, a score chart disposed on the outer surface of the drum, including a plurality of score-recording spaces corresponding to the pockets of said carriers, means for revolving said carriers to bring a set of pockets in registration with said apertures and simultaneously presenting, for recording the score, a score space of the chart corresponding to the set of registered pockets, and means by which said drum may be removably mounted and detachably connected with said driving means to permit adjustment of the score chart thereon.

JUDSON E. FULLER.